(12) United States Patent
Addanki et al.

(10) Patent No.: US 10,367,238 B2
(45) Date of Patent: Jul. 30, 2019

(54) SPACE EFFICIENT BATTERY PACK DESIGNS

(71) Applicant: FORD GLOBAL TECHNOLOGIES, LLC, Dearborn, MI (US)

(72) Inventors: Hari Krishna Addanki, Novi, MI (US); George Albert Garfinkel, Westland, MI (US); Jeffrey Matthew Haag, Detroit, MI (US); Patrick Daniel Maguire, Ann Arbor, MI (US); Kevin A. Montgomery, Royal Oak, MI (US); Lucas Amber, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/229,552

(22) Filed: Aug. 5, 2016

(65) Prior Publication Data
US 2018/0040930 A1 Feb. 8, 2018

(51) Int. Cl.
| | |
|---|---|
| *H01M 10/613* | (2014.01) |
| *H01M 10/6556* | (2014.01) |
| *H01M 2/10* | (2006.01) |
| *H01M 2/12* | (2006.01) |
| *H01M 10/6557* | (2014.01) |
| *H01M 10/625* | (2014.01) |
| *H01M 10/663* | (2014.01) |

(52) U.S. Cl.
CPC ....... *H01M 10/613* (2015.04); *H01M 2/1077* (2013.01); *H01M 2/12* (2013.01); *H01M 10/625* (2015.04); *H01M 10/6556* (2015.04); *H01M 10/663* (2015.04); *H01M 10/6557* (2015.04); *H01M 2220/20* (2013.01)

(58) Field of Classification Search
CPC ............ H01M 10/613; H01M 10/625; H01M 10/6556; H01M 10/6557; H01M 10/663; H01M 2/1077; H01M 2/12; H01M 2220/20
See application file for complete search history.

(56) References Cited

U.S. PATENT DOCUMENTS

| | | | |
|---|---|---|---|
| 8,168,317 B2 | 5/2012 | Yoon et al. | |
| 8,387,733 B2 | 3/2013 | Nakamura | |
| 8,895,177 B2 | 11/2014 | Marchio et al. | |
| 9,203,068 B2 | 12/2015 | Utley et al. | |

(Continued)

FOREIGN PATENT DOCUMENTS

KR 20150094030 A 8/2015

OTHER PUBLICATIONS

"axial", Collins English Dictionary, edited by Collins Dictionaries, 12th edition, 2014. (Year: 2014).*

*Primary Examiner* — Sarah A. Slifka
*Assistant Examiner* — Lilia Nedialkova
(74) *Attorney, Agent, or Firm* — Carlson, Gaskey & Olds

(57) ABSTRACT

A battery pack includes a first side oriented battery assembly, a second side oriented battery assembly, and a vent chamber arranged between the first side oriented battery assembly and the second side oriented battery assembly. The first and second side oriented battery assemblies are thus arranged to share a common vent chamber. One of the first and second side oriented battery assemblies may additionally share a common heat exchanger device with a third side oriented battery assembly.

22 Claims, 4 Drawing Sheets

(56) References Cited

U.S. PATENT DOCUMENTS

| | | | |
|---|---|---|---|
| 2005/0170239 A1* | 8/2005 | Uemoto | H01M 10/625 |
| | | | 429/120 |
| 2005/0285567 A1* | 12/2005 | Kim | H01M 2/1077 |
| | | | 320/116 |
| 2009/0142628 A1 | 6/2009 | Okada et al. | |
| 2009/0274952 A1* | 11/2009 | Wood | B60L 11/1874 |
| | | | 429/99 |
| 2011/0318618 A1* | 12/2011 | Yajima | H01M 2/1077 |
| | | | 429/72 |
| 2012/0034526 A1* | 2/2012 | Kurahashi | H01M 2/1673 |
| | | | 429/221 |
| 2013/0011713 A1* | 1/2013 | Harada | H01M 2/1077 |
| | | | 429/120 |
| 2013/0095360 A1* | 4/2013 | Niedzwiecki | H01M 2/1077 |
| | | | 429/99 |
| 2015/0030897 A1 | 1/2015 | Paramasivam et al. | |
| 2015/0044538 A1 | 2/2015 | Katayama et al. | |
| 2015/0060169 A1 | 3/2015 | Janarthanam et al. | |
| 2015/0243957 A1* | 8/2015 | Han | H01M 2/34 |
| | | | 429/61 |
| 2016/0093932 A1 | 3/2016 | Obasih et al. | |

\* cited by examiner ically differ from conventional motor vehicles because they are selectively driven by one or more battery powered electric machines. Conventional motor vehicles, by contrast, rely exclusively on the internal combustion engine to power and propel the vehicle.

SPACE EFFICIENT BATTERY PACK DESIGNS

TECHNICAL FIELD

This disclosure relates to battery packs for electrified vehicles. An exemplary battery pack includes side oriented battery assemblies that share a common vent chamber.

BACKGROUND

The desire to reduce automotive fuel consumption and emissions is well documented. Therefore, vehicles are being developed that reduce or completely eliminate reliance on internal combustion engines. Electrified vehicles are one type of vehicle currently being developed for this purpose. In general, electrified vehicles differ from conventional motor vehicles because they are selectively driven by one or more battery powered electric machines. Conventional motor vehicles, by contrast, rely exclusively on the internal combustion engine to power and propel the vehicle.

A high voltage traction battery pack typically powers the electric machines and other electrical loads of the electrified vehicle. The battery pack includes a plurality of interconnected battery cells that store energy for powering these electrical loads. There is often a limited amount of space available within a vehicle for accommodating the battery pack. Space efficient battery pack designs are therefore desirable.

SUMMARY

A battery pack according to an exemplary aspect of the present disclosure includes, among other things, a first side oriented battery assembly, a second side oriented battery assembly, and a vent chamber arranged between the first side oriented battery assembly and the second side oriented battery assembly.

In a further non-limiting embodiment of the foregoing battery pack, the first side oriented battery assembly and the second side oriented battery assembly each include a plurality of battery cells.

In a further non-limiting embodiment of either of the foregoing battery packs, the plurality of battery cells are arranged such that a first dimension extending along an X-axis of the plurality of battery cells is smaller than a second dimension extending along a Z-axis of the plurality of battery cells.

In a further non-limiting embodiment of any of the foregoing battery packs, the first side oriented battery assembly and the second side oriented battery assembly are larger in a vertical direction than in a horizontal direction.

In a further non-limiting embodiment of any of the foregoing battery packs, a first vent of a first battery cell of the first side oriented battery assembly faces toward a second vent of a second battery cell of the second side oriented battery assembly such that both the first vent and the second vent are in fluid communication with the vent chamber.

In a further non-limiting embodiment of any of the foregoing battery packs, the vent chamber is an enclosed space established by a top plate, a bottom plate, and two end plates.

In a further non-limiting embodiment of any of the foregoing battery packs, at least one of the top plate, the bottom plate, or the two end plates rests against a ledge strip.

In a further non-limiting embodiment of any of the foregoing battery packs, at least one of the top plate, the bottom plate, or the two end plates rests against a ledge established by a tab of a spacer.

In a further non-limiting embodiment of any of the foregoing battery packs, at least one of the top plate, the bottom plate, or the two end plates rests against a ledge established by an arm of a side rail.

In a further non-limiting embodiment of any of the foregoing battery packs, vent tubing is connected to at least one of the top plate, the bottom plate, or the two end plates.

In a further non-limiting embodiment of any of the foregoing battery packs, the first side oriented battery assembly includes a first heat exchanger device and the second side oriented battery assembly includes a second heat exchanger device.

In a further non-limiting embodiment of any of the foregoing battery packs, a heat exchanger device is positioned axially between one of the first side oriented battery assembly and the second side oriented battery assembly and a third side oriented battery assembly.

In a further non-limiting embodiment of any of the foregoing battery packs, the heat exchanger device includes at least one coolant passage.

In a further non-limiting embodiment of any of the foregoing battery packs, a heat exchanger device establishes an outer wall of the battery pack.

In a further non-limiting embodiment of any of the foregoing battery packs, a heat exchanger device establishes an internal barrier of the battery pack.

A method according to another exemplary aspect of the present disclosure includes, among other things, arranging a first side oriented battery assembly relative to a second side oriented battery assembly of a battery pack such that the first and second side oriented battery assemblies share a common vent chamber.

In a further non-limiting embodiment of the foregoing methods, the arranging includes facing a first vent of a first battery cell of the first side oriented battery assembly toward a second vent of a second battery cell of the second side oriented battery assembly.

In a further non-limiting embodiment of either of the foregoing methods, the arranging includes positioning a heat exchanger device to establish an outer wall of the battery pack.

In a further non-limiting embodiment of any of the foregoing methods, the arranging includes positioning a heat exchanger device to establish an internal barrier of the battery pack.

In a further non-limiting embodiment of any of the foregoing methods, the first side oriented battery assembly and the second side oriented battery assembly include a plurality of battery cells, and the method includes arranging the plurality of battery cells such that a first dimension extending along an X-axis of the plurality of battery cells is smaller than a second dimension extending along a Z-axis of the plurality of battery cells.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details various battery pack designs for use within electrified vehicles. An exemplary battery pack includes first and second side oriented battery assemblies. The first and second side oriented battery assemblies can be arranged to share a common vent chamber for establishing a space efficient packaging design. These and other features are discussed in greater detail in the following paragraphs of this detailed description.

Figure 1:
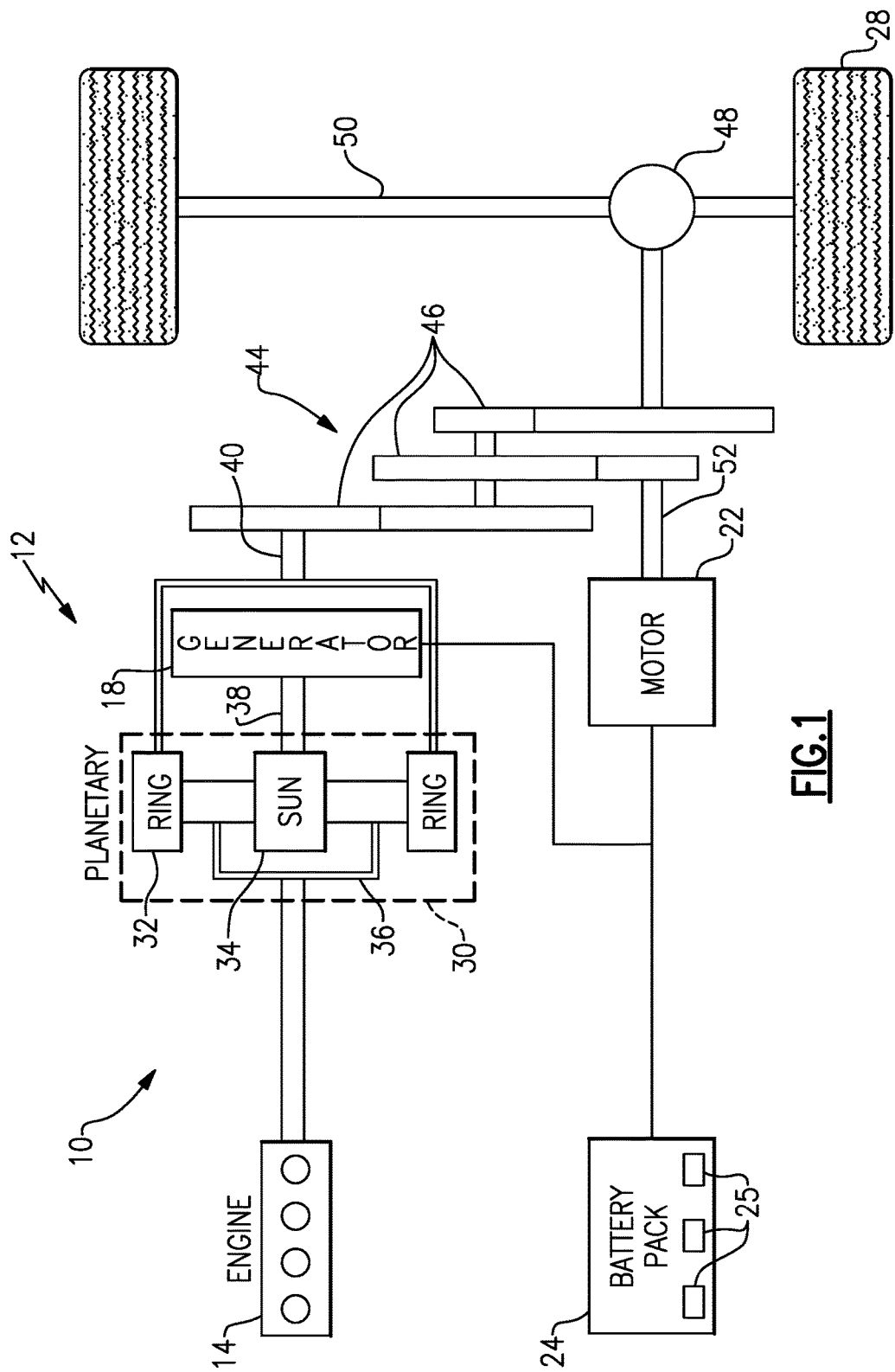
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), and fuel cell vehicles.

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22 and/or other electrical loads of the electrified vehicle 12. Other types of energy storage devices and/or output devices could also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
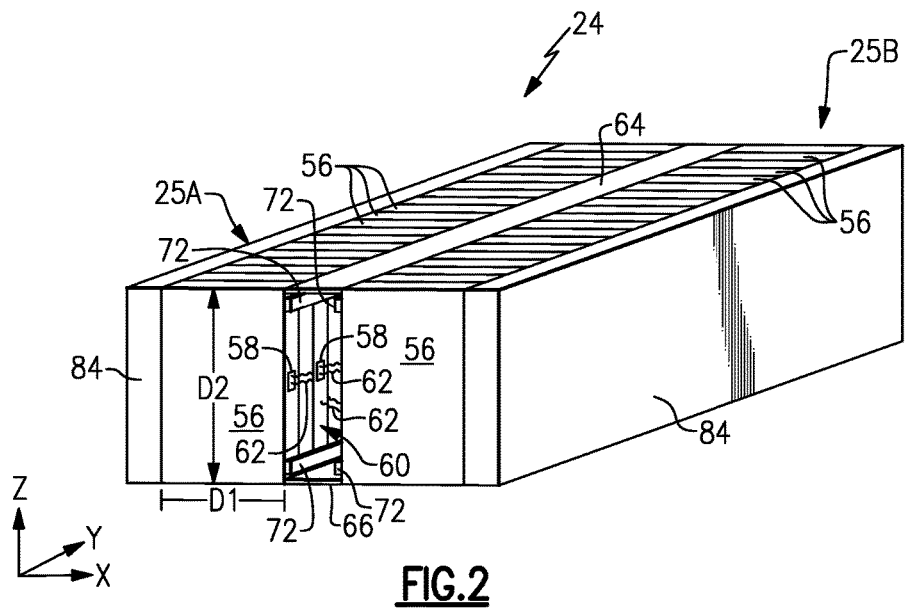
FIG. 2 illustrates a battery pack having a space efficient design.
Figure 3:
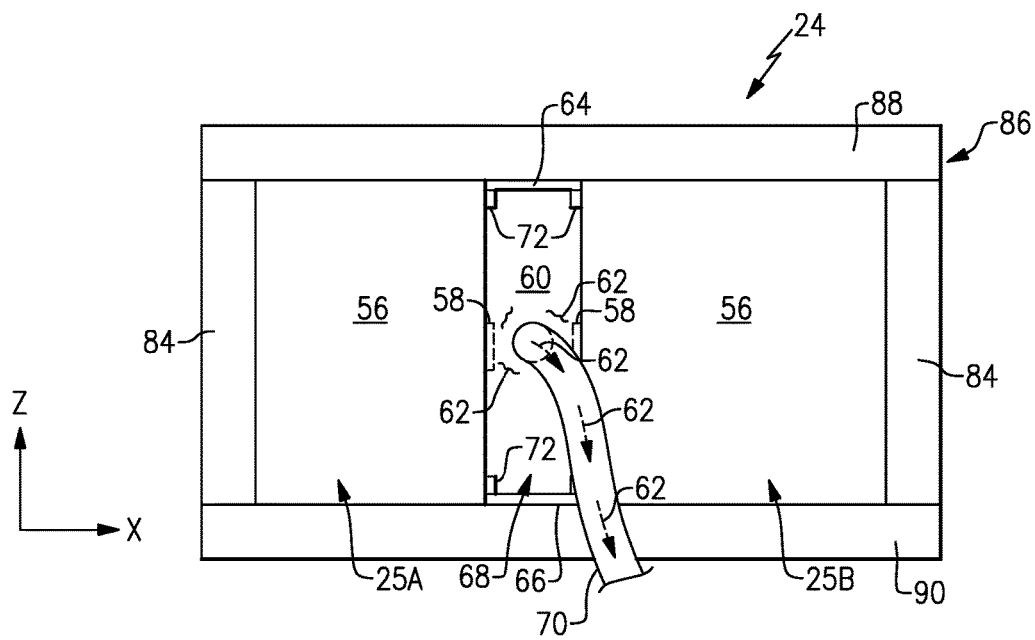
FIG. 3 illustrates additional features of the battery pack of FIG. 2.

FIGS. 2 and 3 illustrate a battery pack 24 that can be employed within an electrified vehicle. For example, the battery pack 24 could be part of the electrified vehicle 12 of FIG. 1.

The battery pack 24 includes a first battery assembly 25A and a second battery assembly 25B arranged adjacent to the first battery assembly 25A. Each battery assembly 25A, 25B includes a plurality of battery cells 56 that store electrical power for powering various electrical loads of the electrified vehicle 12. Although a specific number of battery cells 56 are depicted in FIG. 2, the battery pack 24 could employ a greater or fewer number of battery cells within the scope of this disclosure. In other words, this disclosure is not limited to the specific configuration shown in FIGS. 2 and 3.

The battery cells 56 of each battery assembly 25A, 25B may be stacked side-by-side along a longitudinal axis to construct a grouping of battery cells 56, sometimes referred to as a "cell stack." The battery pack 24 may include two or more separate groupings of battery cells 56.

In a non-limiting embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 56, along with any other support structures (e.g., spacers, rails, walls, plates, bindings, etc.), may collectively be referred to as a battery assembly. Two battery assemblies 25A, 25B are shown in FIGS. 2 and 3; however, the battery pack 24 could include a greater number of battery assemblies within the scope of this disclosure.

The first and second battery assemblies 25A, 25B are considered "side oriented battery assemblies" because they are oriented on their sides rather than their bottoms. In such a configuration, for example, a dimension D1 that extends along an X-axis (i.e., a horizontal axis) of the battery cells 56 of each battery assembly 25A, 25B is smaller than a dimension D2 that extends along a Z-axis (i.e., a vertical axis) of the battery cells 56 (see FIG. 2). Thus, in this non-limiting embodiment, the first and second battery assemblies 25A, 25B are larger in the vertical direction than in the horizontal direction. This configuration allows the battery pack 24 to be efficiently packaged into a vehicle space that has sufficient vertical room but may be limited in the horizontal direction.

The battery cells 56 of both the first and second battery assemblies 25A, 25B may each include one or more vents 58 that vent to a common or shared vent chamber 60. In a non-limiting embodiment, the vents 58 of the battery cells 56 of the first battery assembly 25A face the vents 58 of the battery cells 56 of the second battery assembly 25B due to the side oriented nature of these assemblies. The vent chamber 60 is located axially between the first and second battery assemblies 25A, 25B, in this non-limiting embodiment.

The vents 58 may expel battery vent byproducts 62, such as gases or other byproducts, from the battery cells 56 during certain battery cell venting events. For example, battery venting events may occur during over-temperature or over-charging conditions of the battery cells 56, or during other cell conditions.

The vent chamber 60 is established by multiple plates that are attached to the first and second battery assemblies 25A, 25B. For example, the vent chamber may include a top plate 64, a bottom plate 66, and two end plates 68. The top plate 64 and the bottom plate 66 are best illustrated in FIG. 2, whereas one of the end plates 68 is illustrated in FIG. 3. Another end plate 68 is located at an opposite end of the battery pack 24 and is therefore not shown in the exemplary figures. Together, the top plate 64, the bottom plate 66, and the end plates 68 establish an enclosed space for capturing the battery vent byproducts 62. The battery vent byproducts 62 may be expelled from the vent chamber 60 to a location external to the battery pack 24 through vent tubing 70. In a non-limiting embodiment, the vent tubing 70 is connected to one or both of the end plates 68 (see, e.g., FIG. 3). However, the vent tubing 70 could be connected to the vent chamber 60 at other locations.

The top plate 64, the bottom plate 66, and the end plates 68 may be positioned relative to the first and second battery assemblies 25A, 25B using a variety of techniques. In a first non-limiting embodiment, ledge strips 72 are attached across the battery cells 56 of each battery assembly 25A, 25B (see, e.g., FIGS. 2 and 3). The top plate 64 and bottom plate 66 rest against the ledge strips 72 such that they are positioned flush with the external surfaces of the battery assemblies 25A, 25B. The end plates 68 may be positioned in a similar manner.

Figure 4:
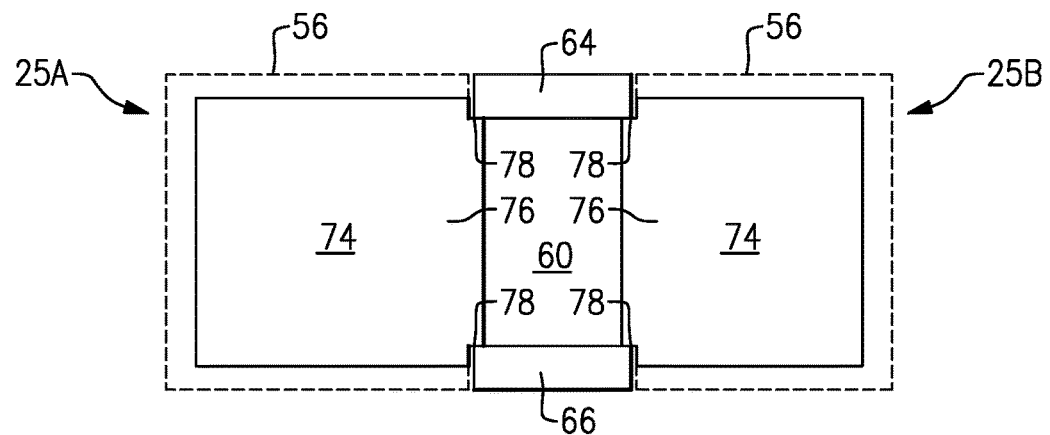
FIG. 4 illustrates a battery pack vent chamber configuration.

In another non-limiting embodiment, shown in FIG. 4, adjacent battery cells 56 of each battery assembly 25A, 25B are separated by a spacer 74. Each spacer 74 includes a tab 76 that extends beyond edges of the adjacent battery cells 56. The tabs 76 establish ledges 78 for receiving the plates. For example, the top plate 64 and the bottom plate 66 may rest against the ledges 78.

Figure 5:
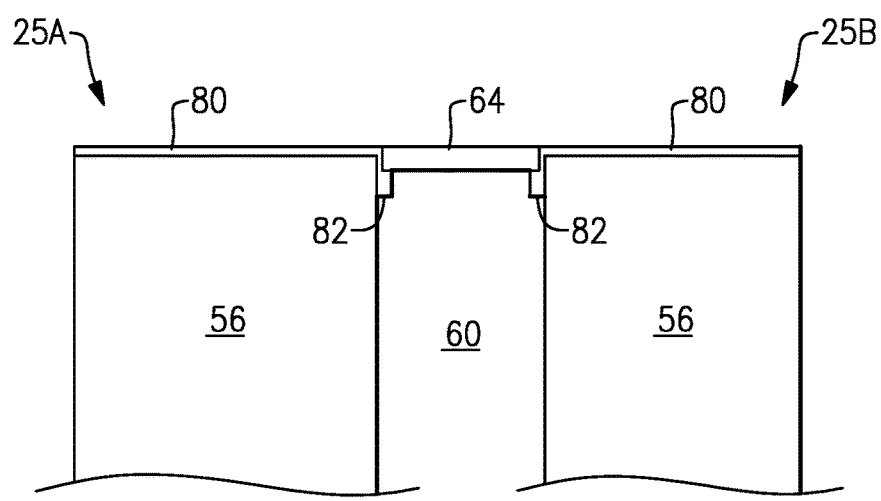
FIG. 5 illustrates another battery pack vent chamber configuration.

In yet another non-limiting embodiment, shown in FIG. 5, each battery assembly 25A, 25B includes a side rail 80. The side rails 80 include arms 82 that extend into the vent chamber 60. The arms 82 catch the plates (only top plate 64 shown in FIG. 5).

Referring again to FIGS. 2 and 3, each of the first and second battery assemblies 25A, 25B additionally includes a heat exchanger device 84, which may sometimes be referred to as a cold plate. The heat exchanger devices 84 are positioned on an opposite side of their respective battery assembly 25A, 25B from the vent chamber 60.

The heat exchanger devices 84 serve multiple functions. A first function of the heat exchanger devices 84 is to thermally manage the battery cells 56 of the battery assemblies 25A, 25B. For example, heat may be generated and released by the battery cells 56 during charging operations, discharging operations, extreme ambient conditions, or other conditions. It is often desirable to remove the heat from the battery pack 24 to improve performance and life of the battery cells 56. The heat exchanger devices 84 are configured to conduct the heat out of the battery cells 56 of the battery assemblies 25A, 25B. In other words, the heat exchanger devices 84 act as heat sinks to remove heat from the heat sources (i.e., the battery cells 56). The heat exchanger devices 84 can alternatively be employed to heat the battery cells 56, such as during extremely cold ambient conditions. In a further non-limiting embodiment, the heat exchanger devices 84 could be configured with one or more coolant passages for communicating a medium, such as coolant, air, or refrigerant, to dissipate heat from the battery assemblies 25A, 25B.

The heat exchanger devices 84 may also function to create a barrier or wall of the battery pack 24. For example, the heat exchanger devices 84 could act as either an outer wall of the battery pack 24 or as a barrier between the first or second battery assembly 25A, 25B and additional battery assemblies inside the battery pack 24. In the illustrated embodiment, the heat exchanger devices 84 are arranged as outer side walls of an enclosure assembly 86 that also includes a lid 88 and a base 90 (see, e.g., FIG. 3). Although not shown, the lid 88 and the base 90 could also be configured with one or more coolant passages for communicating a medium, such as coolant, air, or refrigerant, to dissipate heat from the battery assemblies 25A, 25B.

Figure 6:
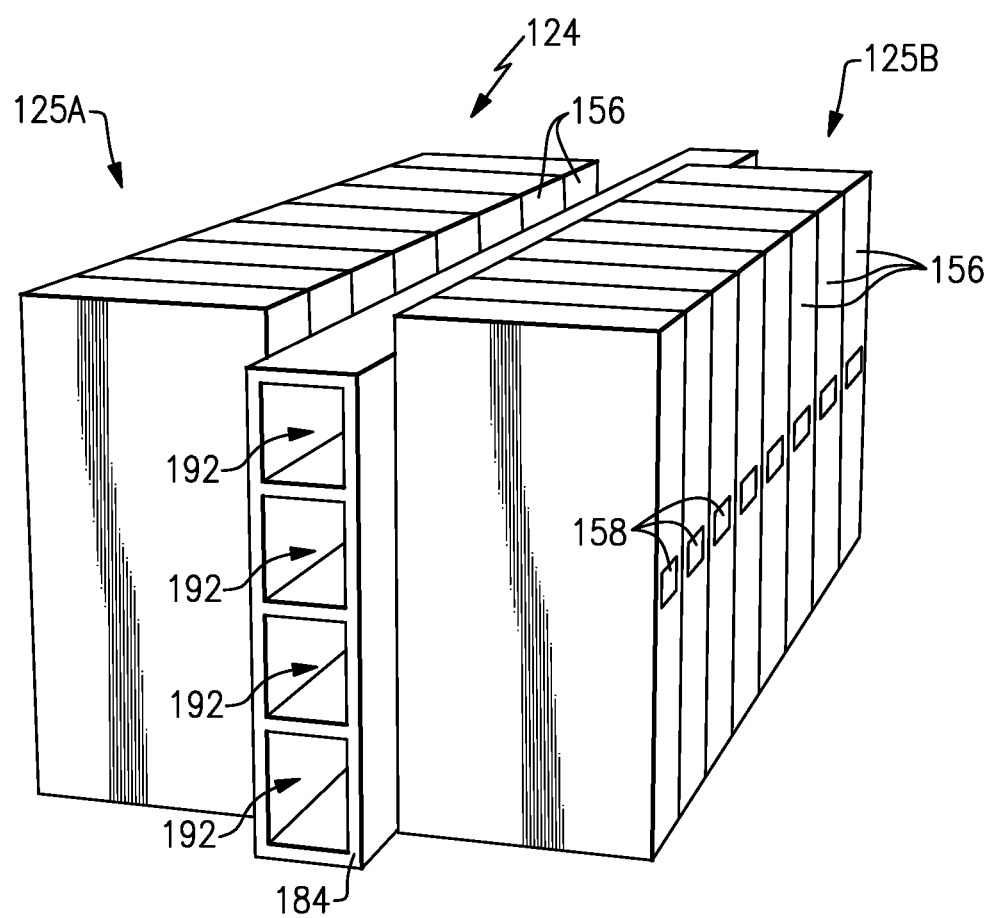
FIG. 6 illustrates another exemplary battery pack having a space efficient design.

FIG. 6 illustrates another exemplary battery pack 124 that exhibits a space efficient packaging design. The battery pack 124 includes a first battery assembly 125A and second battery assembly 125B that share a common heat exchanger device 184. The heat exchanger device 184 is disposed axially between the first battery assembly 125A and the second battery assembly 125B.

The first and second battery assemblies 125A, 125B are side oriented assemblies that each include a plurality of battery cells 156. The battery cells 156 may each include one or more vents 158. In this non-limiting embodiment, the vents 158 of the battery cells 156 of the first battery assembly 125A face in a direction away from the vents 158 of the battery cells 156 of the second battery assembly 125B.

The exemplary heat exchanger device 184 is configured to conduct heat out of the battery cells 156 of the battery assemblies 125A, 125B. In a non-limiting embodiment, the heat exchanger device 184 includes one or more coolant passages 192 that extend therethrough. A medium, such as coolant, air, or refrigerant, may be communicated through each coolant passage 192 to dissipate heat from both the first battery assembly 125A and the second battery assembly 125B by forced convection.

In another non-limiting embodiment, the battery pack 124 of FIG. 6 can be used in combination with the battery pack 24 of FIGS. 2-5 to provide a scalable design. Multiple battery packs 24 and battery packs 124 can be stacked together within a single assembly to provide a space-efficient design in which both vent chambers and heat exchanger devices are shared by two or more battery assemblies.

The battery packs of this disclosure exhibit space efficient packaging designs. The space efficient packaging designs are achieved by arranging the battery assemblies of the pack such that the assemblies share a common vent chamber or a common heat exchanger device.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
   a first side oriented battery assembly;
   a second side oriented battery assembly;
   a vent chamber arranged between said first side oriented battery assembly and said second side oriented battery assembly; and
   a heat exchanger device positioned axially between one of said first side oriented battery assembly and said second side oriented battery assembly and a third side oriented battery assembly,
   wherein said heat exchanger device extends along a first longitudinal axis that is parallel to a second longitudinal axis of said vent chamber,
   wherein said vent chamber is an enclosed space established by a top plate, a bottom plate, and two end plates,
   wherein said top plate and said bottom plate rest against ledge strips that are attached to said first side oriented battery assembly or said second side oriented battery assembly,
   wherein said top plate is contiguous with an enclosure lid and said bottom plate is contiguous with an enclosure base.

2. The battery pack as recited in claim 1, wherein said first side oriented battery assembly and said second side oriented battery assembly each include a plurality of battery cells.

3. The battery pack as recited in claim 2, wherein said plurality of battery cells are arranged such that a first dimension extending along an X-axis of said plurality of battery cells is smaller than a second dimension extending along a Z-axis of said plurality of battery cells.

4. The battery pack as recited in claim 1, wherein said first side oriented battery assembly and said second side oriented battery assembly are larger in a vertical direction than in a horizontal direction.

5. The battery pack as recited in claim 1, wherein a first vent of a first battery cell of said first side oriented battery assembly faces toward a second vent of a second battery cell of said second side oriented battery assembly such that both said first vent and said second vent are in fluid communication with said vent chamber.

6. The battery pack as recited in claim 1, wherein said ledge strips are established by a first arm of a first side rail of said first side oriented battery assembly and a second arm of a second side rail of said second side oriented battery assembly.

7. The battery pack as recited in claim 1, comprising vent tubing connected to at least one of said top plate, said bottom plate, or said two end plates.

8. The battery pack as recited in claim 1, wherein said first side oriented battery assembly includes said heat exchanger device and said second side oriented battery assembly includes a second heat exchanger device.

9. The battery pack as recited in claim 1, wherein said heat exchanger device includes at least one coolant passage.

10. The battery pack as recited in claim 1, wherein said heat exchanger device establishes an internal barrier of said battery pack.

11. The battery pack as recited in claim 1, wherein said heat exchanger device is positioned on an opposite side of said one of said first side oriented battery assembly and said second side oriented battery assembly from said vent chamber.

12. The battery pack as recited in claim 1, wherein said heat exchanger device is contiguous with at least two battery cells of said one of said first side oriented battery assembly and said second side oriented battery assembly.

13. The battery pack as recited in claim 1, wherein at least one of said top plate and said bottom plate sits flush with external surfaces of said first side oriented battery assembly and said second side oriented battery assembly.

14. The battery pack as recited in claim 1, wherein said top plate and said bottom plate rests against said ledge strips, and said ledge strips extend across multiple battery cells of said first side oriented battery assembly and said second side oriented battery assembly.

15. The battery pack as recited in claim 1, wherein said ledge strips are spaced apart from edges of said first side oriented battery assembly and said second side oriented battery assembly.

16. The battery pack as recited in claim 1, wherein said top plate, said bottom plate, and said two end plates are each separate plates from one another.

17. A battery pack comprising:
a first side oriented battery assembly;
a second side oriented battery assembly;
a vent chamber arranged between said first side oriented battery assembly and said second side oriented battery assembly; and
a heat exchanger device positioned axially between one of said first side oriented battery assembly and said second side oriented battery assembly and a third side oriented battery assembly,
wherein said heat exchanger device extends along a first longitudinal axis that is parallel to a second longitudinal axis of said vent chamber,
wherein said vent chamber is an enclosed space established by a top plate, a bottom plate, and two end plates,
wherein said top plate and said bottom plate rest against ledge strips that are attached to said first side oriented battery assembly or said second side oriented battery assembly,
wherein said ledge strips are established by spacers that are positioned between battery cells of said first side oriented battery assembly and said second side oriented battery assembly.

18. A method, comprising:
arranging a first side oriented battery assembly relative to a second side oriented battery assembly of a battery pack such that the first and second side oriented battery assemblies share a common vent chamber;
enclosing the common vent chamber with a top plate, a bottom plate, a first end plate, and a second end plate, wherein the top plate and the bottom plate rest against ledge strips that are attached to the first side oriented battery assembly or the second side oriented battery assembly; and
positioning a heat exchanger device axially between the first side oriented battery assembly and a third side oriented battery assembly,
wherein the heat exchanger device extends along a first longitudinal axis that is parallel to a second longitudinal axis of said vent chamber,
wherein the top plate is contiguous with an enclosure lid and the bottom plate is contiguous with an enclosure base.

19. The method as recited in claim 18, wherein the arranging includes facing a first vent of a first battery cell of the first side oriented battery assembly toward a second vent of a second battery cell of the second side oriented battery assembly.

20. The method as recited in claim 18, wherein the heat exchanger device establishes an internal barrier of the battery pack.

21. The method as recited in claim 18, wherein the first side oriented battery assembly and the second side oriented battery assembly include a plurality of battery cells, and comprising:
arranging the plurality of battery cells such that a first dimension extending along an X-axis of the plurality of battery cells is smaller than a second dimension extending along a Z-axis of the plurality of battery cells.

22. A battery pack, comprising:
a first side oriented battery assembly;
a second side oriented battery assembly;
a first vent chamber arranged between the first side oriented battery assembly and the second side oriented battery assembly;
a first top plate, a first bottom plate, a first end plate, and a second end plate arranged to enclose said first vent chamber, wherein said first top plate and said first bottom plate rest against a first plurality of ledge strips that is attached to either said first side oriented battery assembly or said second side oriented battery assembly;
wherein said first plurality of ledge strips is established by spacers that are positioned between battery cells of said first side oriented battery assembly and said second side oriented battery assembly,
a first cold plate positioned on an opposite side of the first side oriented battery assembly from the first vent chamber;
a second cold plate positioned on an opposite side of the second side oriented battery assembly from the first vent chamber;
a third side oriented battery assembly positioned on an opposite side of the first cold plate from the first side oriented battery assembly;
a fourth side oriented battery assembly axially displaced from the third side oriented battery assembly;
a second vent chamber arranged between the third side oriented battery assembly and the fourth side oriented battery assembly; and
a second top plate, a second bottom plate, a third end plate, and a fourth end plate arranged to enclose said second vent chamber, wherein said second top plate and said second bottom plate rest against a second plurality of ledge strips that are attached to either said third side oriented battery assembly or said fourth side oriented battery assembly.

* * * * *